US009539975B2

(12) United States Patent
Tanabe et al.

(10) Patent No.: US 9,539,975 B2
(45) Date of Patent: Jan. 10, 2017

(54) SEAT FRAME

(71) Applicant: TS TECH CO., LTD., Asaka-shi, Saitama (JP)

(72) Inventors: Jinichi Tanabe, Tochigi (JP); Masaya Furuta, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 64 days.

(21) Appl. No.: 14/385,881

(22) PCT Filed: Mar. 21, 2013

(86) PCT No.: PCT/JP2013/058130
§ 371 (c)(1),
(2) Date: Sep. 17, 2014

(87) PCT Pub. No.: WO2013/141316
PCT Pub. Date: Sep. 26, 2013

(65) Prior Publication Data
US 2015/0076802 A1   Mar. 19, 2015

(30) Foreign Application Priority Data

Mar. 23, 2012 (JP) ................................. 2012-067299

(51) Int. Cl.
*B60R 21/207* (2006.01)
*B60N 2/68* (2006.01)
(Continued)

(52) U.S. Cl.
CPC ............... *B60R 21/207* (2013.01); *B60N 2/68* (2013.01); *B60N 2002/5808* (2013.01); *B60R 2021/161* (2013.01); *B60R 2021/2076* (2013.01)

(58) Field of Classification Search
CPC .. B60R 21/207; B60R 2/68; B60R 2021/2076; B60R 2021/161; B60R 2002/5808
(Continued)

(56) References Cited

U.S. PATENT DOCUMENTS 5,967,546 A * 10/1999 Homier ................ B60N 2/5883
  280/730.2
6,378,946 B1 * 4/2002 Cope ......................... B60N 2/64
  297/452.18
(Continued)

FOREIGN PATENT DOCUMENTS

DE  102005037045 A1   2/2007
JP  2002-120686 A     4/2002
(Continued)

OTHER PUBLICATIONS

Office Action issued in related application JP 2012-067299, Jan. 5, 2016, with machine generated English language translation, 6 pages.

*Primary Examiner* — Karen Beck
(74) *Attorney, Agent, or Firm* — Drinker Biddle & Reath LLP

(57) ABSTRACT

Provided is a readily-attached seat frame that has a compact periphery of a stay cloth attachment portion while maintaining a high deployment performance of an airbag. A seat frame is provided in which an airbag module is disposed in a seat back frame. The seat back frame is provided with a guide member end attachment member that locks ends of guide members for facilitating the deployment of an airbag provided in the airbag module, and the attachment positions of the guide members in the guide member end attachment member are disposed at the inside of the seat back frame in relation to the attachment position of the airbag module 6.

17 Claims, 11 Drawing Sheets

(51) Int. Cl.
*B60N 2/58* (2006.01)
*B60R 21/16* (2006.01)

(58) Field of Classification Search
USPC .................................................... 280/730.2
See application file for complete search history.

(56) References Cited

U.S. PATENT DOCUMENTS

| | | | | |
|---|---|---|---|---|
| 6,439,597 | B1* | 8/2002 | Harada | B60R 21/207 280/728.2 |
| 6,578,911 | B2* | 6/2003 | Harada | B60N 2/5825 280/730.2 |
| 7,232,150 | B2* | 6/2007 | Nagayama | B60R 21/20 280/728.3 |
| 7,331,601 | B2* | 2/2008 | Tracht | B60R 21/207 280/728.2 |
| 7,677,594 | B2* | 3/2010 | Hazlewood | B60N 2/5883 280/728.2 |
| 7,677,596 | B2* | 3/2010 | Castro | B60R 21/207 280/728.2 |
| 8,474,858 | B2* | 7/2013 | Urabe | B60R 21/207 280/728.2 |
| 8,820,780 | B2* | 9/2014 | Thomas | B60R 21/207 280/728.2 |
| 9,079,556 | B2* | 7/2015 | Tanabe | B60R 21/207 |
| 2011/0140396 | A1* | 6/2011 | Urabe | B60R 21/207 280/728.2 |
| 2012/0038131 | A1* | 2/2012 | Muller | B60R 21/201 280/728.2 |
| 2015/0076802 | A1* | 3/2015 | Tanabe | B60N 2/68 280/730.2 |

FOREIGN PATENT DOCUMENTS

| | | |
|---|---|---|
| JP | 2009-067151 A | 4/2009 |
| JP | 4452860 B2 | 4/2010 |
| JP | 2010-184668 A | 8/2010 |

* cited by examiner

SEAT FRAME

CROSS REFERENCE TO RELATED APPLICATIONS

This application is the U.S. national phase of the International Patent Application No. PCT/JP2013/058130, filed Mar. 21, 2013, which claims the benefit of the Japanese Patent Application No. 2012-067299, filed Mar. 23, 2012, the entire content being incorporated herein by reference.

BACKGROUND

Disclosed herein is a seat frame, and particularly, a seat frame with a guide member end attachment member that encloses an airbag module provided in a side portion of a seat back and locks a guide member for facilitating the deployment of an airbag.

Hitherto, as an airbag module equipped seat, there has been proposed a seat in which an airbag module is attached to a side frame of a seat back frame, ends of a trim cover and one-side ends of two stay cloths are sewn together to form a fracture portion of the trim cover, the airbag module is enclosed by two stay cloths drawn into the trim cover from the fracture portion, and the entire seat back including the airbag module is covered by the trim cover (for example, Japanese Patent Document No. 4452860 ("the '860 Document")).

In the '860 Document, two listing wires are provided at the position opposite to the airbag module of the side frame to be entangled in a ring shape. The ends of two stay cloths drawn from the fracture portion to both sides of the airbag module are respectively attached to the listing wires while being stretched to two listing wires to enclose the airbag module. A locking member is formed as a metallic bar-shaped body to stand up toward the opposite side to the airbag module of the side frame, and the two listing wires are mutually entangled and fixed while being caught by the locking member.

The locking member includes a trough bent portion which is bent in a V-shape at the position where the listing wires are locked, and the listing wires are locked to the trough bent portion so that the deviation of the listing wire from the locking member in the length direction may be prevented.

According to the invention of the '860 Document, since the listing wire is not deviated from the locking member in the length direction, the end of the stay cloth is not deviated in the width direction during the assembly, and the airbag module is enclosed by the entire area of the stay cloth. Then, since the airbag module may be directly enclosed by the stay cloth and the stay cloth may be reliably pulled and locked by the listing wire, the expansion pressure of the airbag may be caused to efficiently concentrate on the sewn seam of the fracture portion of the trim cover by the stay cloth, and hence a high deployment performance of the airbag may be attained.

However, in the invention of the '860 Document, the listing wire entangling and pulling position is provided at the opposite side to the airbag module of the side frame, and the locking member locking the listing wire is provided to stand up toward the opposite side to the airbag module of the side frame. Further, in order to fasten the end of one stay cloth to the side frame, there is a need to provide three wire members including two listing wires and the locking member in total.

For that reason, since the attachment position of the end of one stay cloth is enlarged, a demand for the compact dimension may not be satisfied. Further, since the number of components increases, manufacturing cost also increases.

Moreover, the assembling workability is poor when the number of components is large or the length of the listing wire is long.

Further, there has been a desire to improve the rigidity by decreasing the number of connection points.

SUMMARY

Various embodiments of the present invention are provided in view of the above-described problem, and an object addressed herein is to provide a seat frame including a guide member end attachment member having a compact periphery of a guide member attachment portion while maintaining a high deployment performance of an airbag.

Further, another object is to provide a readily-attached seat frame including a guide member end attachment member capable of realizing a strong strength.

According to a seat frame of a first embodiment, the above-described problem is solved by a seat frame in which an airbag module is disposed in a seat back frame, wherein the seat back frame is provided with a guide member end attachment member that locks an end of a guide member for facilitating deployment of an airbag provided in the airbag module, and wherein a guide member attachment position of the guide member end attachment member is disposed at an inside of the seat back frame in relation to an airbag module attachment position.

With such a configuration, the guide member may be attached to a side frame with a uniform tension by the guide member end attachment member so that the guide member is not twisted or wrinkled.

Accordingly, the expansion pressure of the airbag may efficiently concentrate on a fracture portion of a trim cover during the deployment of the airbag, and hence the high deployment performance of the airbag may be maintained.

Further, since the guide member attachment position of the guide member end attachment member is located at the inside of the seat back frame, the protrusion of the guide member toward the opposite side (the outside) of the side frame is suppressed.

Moreover, since the periphery of the guide member attachment portion may become compact, a space may be saved, and hence a decrease in size in the width direction of the seat may be realized.

In a second embodiment, the guide member end attachment member may include at least a guide member engagement portion that locks the guide member, leg portions that are respectively bent at an obtuse angle from both ends of the guide member engagement portion and extend in a same direction, and locking portions that respectively extend from front extension portions of the leg portions while being bent in a direction moving away from the guide member engagement portion, the locking portions may be locked to locking holes formed in side frames extending while being separated from each other in a width direction of the seat back frame, the airbag module may be disposed at an outside of the side frame, and the guide member engagement portion may engage with an end of the guide member at an inside of the side frame in relation to the airbag module attachment position.

With such a configuration, since the peripheral space of the side frame may be specifically saved, a decrease in size in the width direction of the seat may be realized.

Further, since the guide member end attachment member may be designed in a compact dimension, there is no need to use a long wire like, for example, the existing listing wire.

For this reason, it is less expensive.

In a third embodiment, the leg portions may be disposed to extend from the locking holes toward a front or rear side of the side frame, and the leg portions may be bent to follow a shape of a front or rear corner of the side frame.

With such a configuration, the protrusion of the guide member toward the opposite side to the side frame is suppressed, and the guide member may be stored in a compact size according to the shape of the side frame.

Accordingly, since the peripheral space of the side frame is saved, a decrease in size in the width direction of the seat may be realized.

In a fourth embodiment, a plurality of the locking portions may be locked to a plurality of the locking holes formed in the side frame, a minimal distance between the plurality of the locking portions may be set to be larger than a distance between the plurality of the locking holes, and the guide member end attachment member may be formed as a member having flexibility. Further, when the plurality of the locking portions are locked to the plurality of locking holes while a force is applied to a plurality of the leg portions so that the minimal distance between the plurality of the locking portions decreases, and the force is released, the locking portions are locked by restoration forces of the plurality of the leg portions.

With such a configuration, since the deviation of the guide member end attachment member hardly occurs and the deviation of the guide member during the non-deployment of the airbag may be suppressed, the strength increases.

Further, since the guide member end attachment member may be easily assembled, the workability is improved.

In a fifth embodiment, the side frame may be provided with an interference suppressing portion that stores the locking portion to suppress the interference with an airbag module attachment member.

Specifically, as in a sixth embodiment, the interference suppressing portion may be a hole that protrudes toward the inside of the side frame and a bottom surface of the interference suppressing portion may be provided with the locking hole. Further, a free end of the locking portion may be inserted in a direction from the inside of the side frame toward the outside thereof to be located within the interference suppressing portion.

With such a configuration, it is possible to prevent the interference between the airbag module attachment member and the locking portion constituting the guide member end attachment member, and hence to dispose the airbag module attachment member on a flat surface.

Accordingly, the entire attachment strength is improved.

According to the first embodiment, the guide member may be attached to the side frame with a uniform tension by the guide member end attachment member so that the guide member is not twisted or wrinkled. Accordingly, the expansion pressure of the airbag may efficiently concentrate on the fracture portion of the trim cover during the deployment of the airbag, and hence the high deployment performance of the airbag may be maintained.

Further, the protrusion of the guide member toward the opposite side (the outside) of the side frame is suppressed.

Moreover, since the periphery of the guide member attachment portion may become compact, a space may be saved, and hence a decrease in size in the width direction of the seat may be realized.

According to the second embodiment, since the periphery space of the side frame may be specifically saved, a decrease in size in the width direction of the seat may be realized.

Further, since the guide member end attachment member may be designed in a compact (short) dimension, it is less expensive.

According to the third embodiment, the protrusion of the guide member toward the opposite side of the side frame is suppressed, and storing the guide member may be stored in a compact size according to the shape of the side frame.

Accordingly, since the peripheral space of the side frame is saved, a decrease in size in the width direction of the seat may be realized.

According to the fourth embodiment, since the deviation of the guide member during the non-deployment of the airbag may be suppressed, the strength increases.

Further, since the guide member end attachment member may be easily assembled, the workability is improved.

According to the fifth and sixth embodiments, it is possible to prevent the interference between the airbag module attachment member and the locking portion constituting the guide member end attachment member, and hence to dispose the airbag module attachment member on a flat surface.

Accordingly, the entire attachment strength is improved.

DETAILED DESCRIPTION

Hereinafter, a seat frame F equipped with a guide member end attachment member according to an embodiment of the present invention will be described with reference to FIGS. 1 to 11.

Furthermore, the configuration described below does not limit the present invention, and may be modified into various forms within the scope of the spirit of the present invention.

Figure 1:
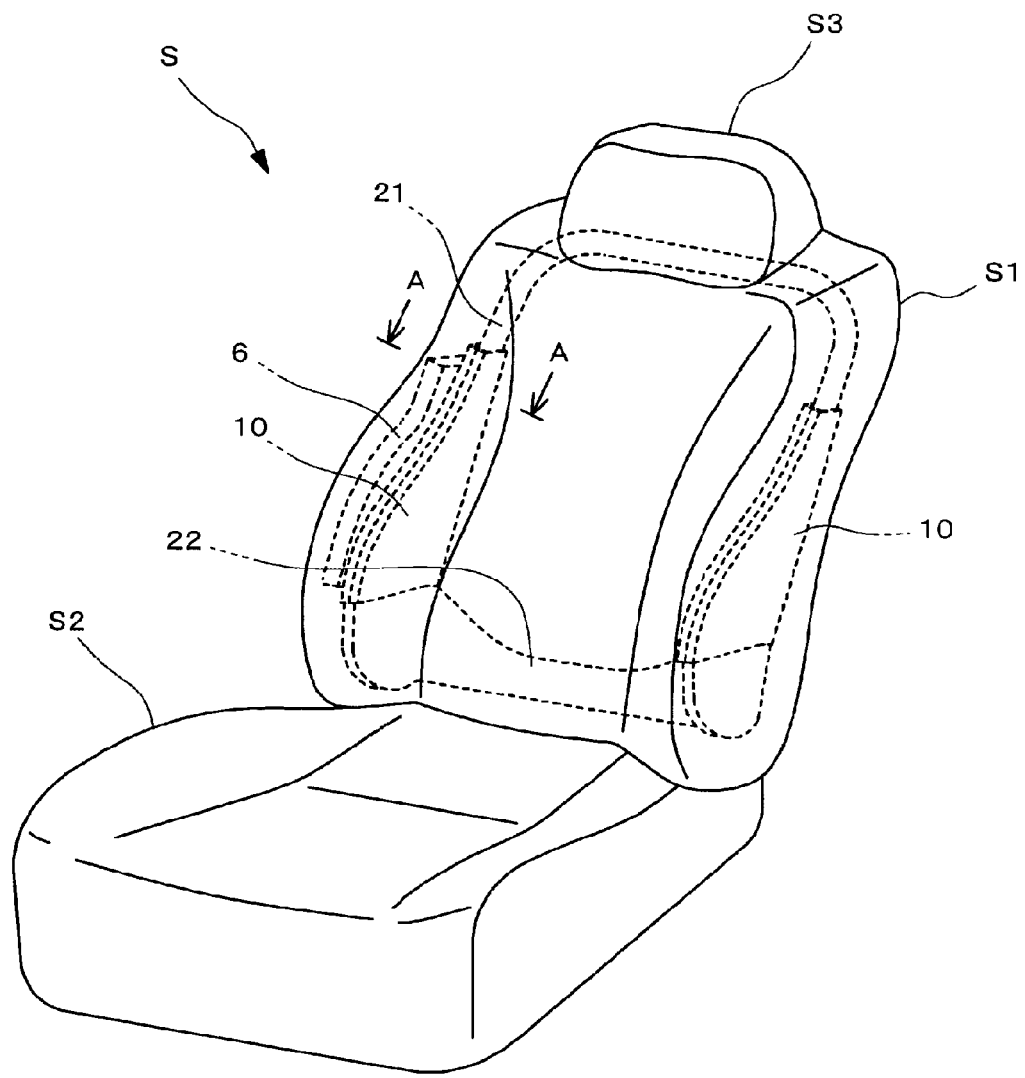
FIG. 1 is a perspective view illustrating an appearance of an airbag module equipped seat according to an embodiment.

As illustrated in FIG. 1, a vehicle seat S according to this embodiment includes a seat back S1, a seat portion S2, and a headrest S3.

Figure 2:
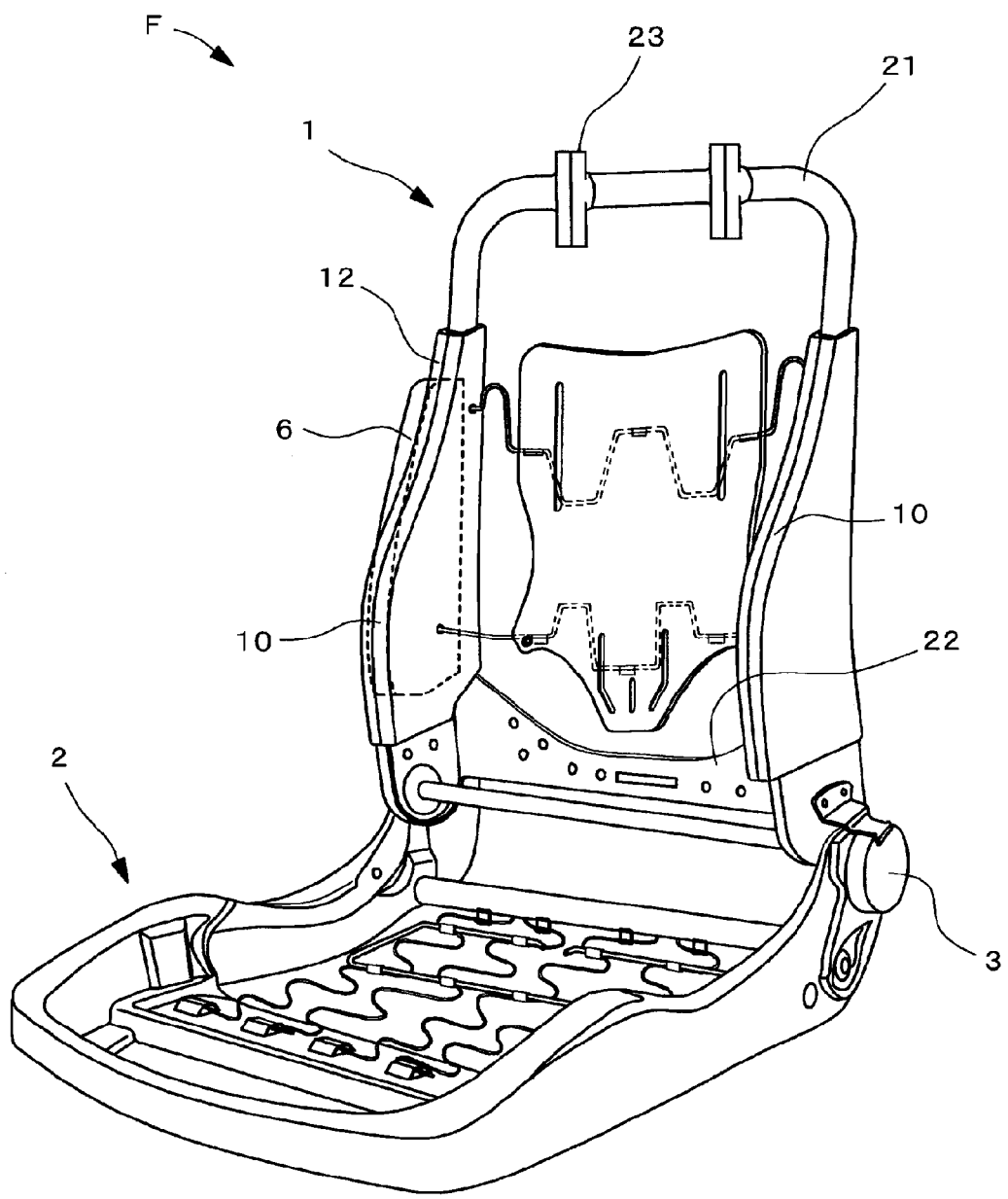
FIG. 2 is a perspective view illustrating a seat frame of the airbag module equipped seat according to the embodiment.
Figure 3:
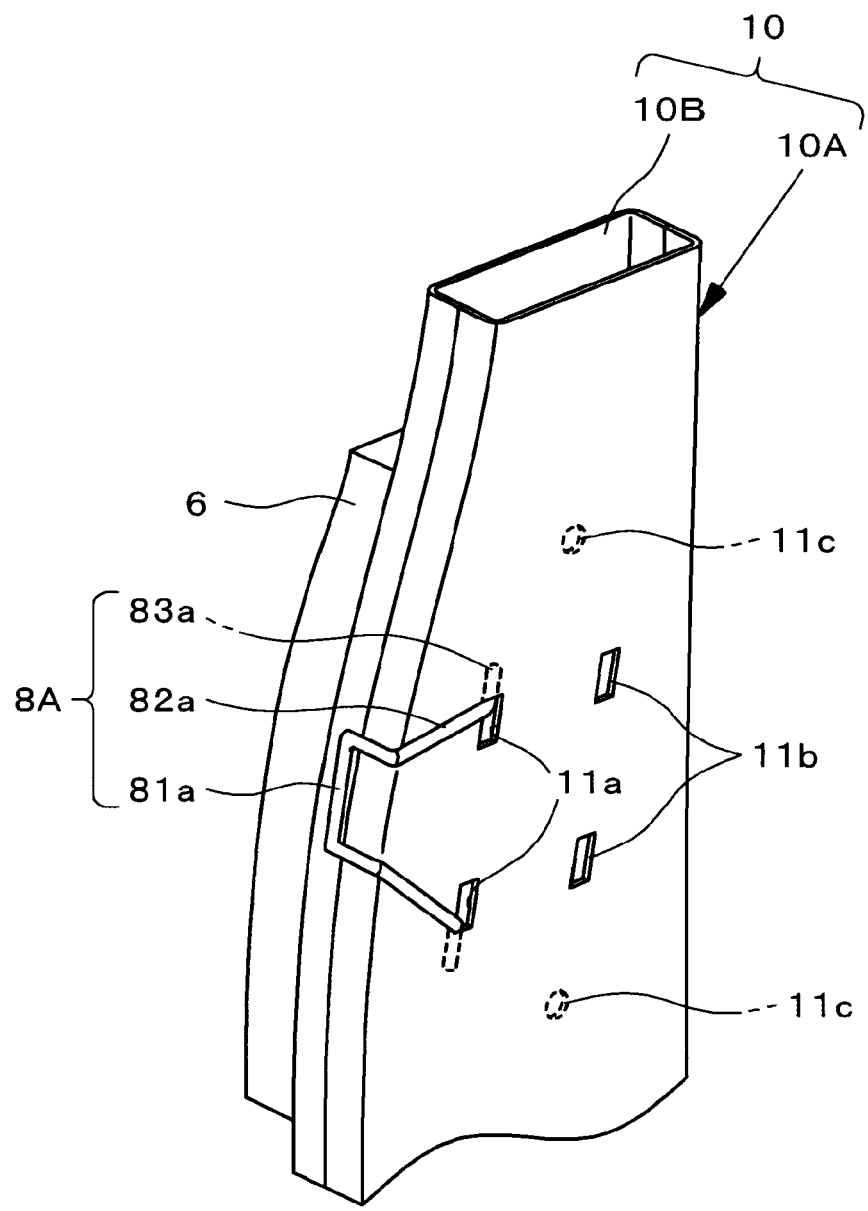
FIG. 3 is a perspective view illustrating an arrangement state of a listing wire according to the embodiment.

A seat frame F illustrated in FIG. 2 is provided in the vehicle seat S. The seat frame F includes a seat back frame 1 as a frame of the seat back S1 and a seat frame 2 as a frame of the seat portion S2.

Further, the seat frame 2 and the seat back frame 1 are connected to each other through a reclining mechanism 3.

The seat back S1 and the seat portion S2 are formed by providing a cushion and a trim cover at the outside of the seat back frame 1 and the seat frame 2.

As illustrated in FIGS. 1 to 4, the seat back S1 mainly includes the seat back frame 1, a cushion pad 5 which is placed on the seat back frame 1, a trim cover 4 which covers the seat back frame 1 and the cushion pad 5, and first and second stay cloths 31 and 32 of which one-side ends are sewn to a fracture portion 40 of the trim cover 4.

The seat back frame 1 is formed in a frame shape by including side frames 10 which are separated from each other at the right and left sides and extend in the up and down direction, an upper frame 21 which connects the upper ends of the side frames 10 to each other, and a lower frame 22 which connects the lower ends thereof to each other.

The side frame 10 is molded by performing a pressing work on a metal sheet, and has a shape formed by the combination of two plates each of which protrudes in a substantially D-shape and a front edge is bent forward as illustrated in FIGS. 1 and 2.

Hereinafter, the inner arrangement side is referred to as the "inner side frame constituting body 10A", and the outer arrangement side is referred to as the "outer side frame constituting body 10B".

The inner side frame constituting body 10A includes an inner plate 11A which has a substantial plate shape, an inner front edge 12A which is formed by folding the front end of the inner plate 11A inward in a U-shape, and an inner rear edge 13A which is formed by bending the rear end thereof inward in an L-shape.

Then, the inner front edge 12A has a structure in which the upper half portion thereof becomes an inclined portion inclined with respect to the up and down direction of the vehicle seat S so that the lower side thereof protrudes forward.

Similarly, the outer side frame constituting body 10B includes an outer plate 11B which has a substantial plate shape, an outer front edge 12B which is formed by folding the front end of the outer plate 11B inward in a U-shape, and an outer rear edge 13B which is formed by bending the rear end thereof inward in an L-shape.

Then, the outer front edge 12B has a structure in which the upper half portion thereof becomes an inclined portion inclined with respect to the up and down direction of the vehicle seat S so that the lower side thereof protrudes forward.

Then, the side frame 10 is formed by the combination of the inner side frame constituting body 10A and the outer side frame constituting body 10B when the end edge of the inner front edge 12A is bonded to the end edge of the outer front edge 12B and the end edge of the inner rear edge 13A is bonded to the end edge of the outer rear edge 13B while the inner wall of the inner plate 11A and the inner wall of the outer plate 11B face each other.

Further, in this embodiment, two front listing wire locking holes 11a and 11a are formed at the front seat side in parallel to each other in the up and down direction in the inner plate 11A constituting the inner side frame constituting body 10A.

Similarly, two rear listing wire locking holes 11b and 11b are formed at the rear seat side in parallel to each other in the up and down direction.

The front listing wire locking holes 11a and the rear listing wire locking holes 11b correspond to the "locking holes".

Further, airbag module attachment holes 11c and 11c are formed in the inner plate 11A (at the matching positions located above and below the positions provided with the front listing wire locking holes 11a and 11a and the rear listing wire locking holes 11b and 11b).

Further, in this embodiment, the front listing wire locking holes 11a and 11a and the rear listing wire locking holes 11b and 11b are formed at substantially the same height positions.

Furthermore, since the front listing wire locking holes 11a and 11a, the rear listing wire locking holes 11b and 11b, and a listing wire 8 correspond to main components described herein, the relation, the function, the operation, and the like thereof will be described later in detail.

An existing airbag module may be used as an airbag module 6 according to this embodiment, but an example thereof will be simply described below.

The airbag module 6 includes an inflator 61, an attachment bracket 62 as an attachment member, an airbag 63, an inflator bracket 64, and the like.

The inflator 61 is attached to the attachment bracket 62 while being held by the inflator bracket 64, and the upper end of the inflator 61 is inserted into the airbag 63.

Further, the base portion of the airbag 63 is attached to the inflator bracket 64.

Furthermore, the inflator bracket 64 is a cylindrical member, and the inflator 61 is inserted thereinto to be held therein.

Then, the attachment bracket 62 to which these components are directly and indirectly attached are attached to the outer surface (the surface facing the opposite side to the seat surface arrangement position) of the outer plate 11B constituting the side frame 10.

Although not illustrated in the drawings, the attachment bracket 62 is provided with two bolt holes which may communicate with the airbag module attachment holes 11c and 11c in a matching state, and the attachment bracket 62 is fixed to the side frame 10 by threading bolts V from the communication holes.

Although a harness and a connector necessary to configure related equipment, such as an impact sensor and a circuit configuration, are arranged therearound, the arrangement method and the arrangement position thereof will not be described, since an existing technique is used.

When a large load is applied from the outside of the vehicle body door into the vehicle body (in the event of a so-called "lateral collision") so that various sensors output corresponding signals, the airbag module 6 with such a configuration is deployed in the seat outer direction (toward the lateral side of the occupant) while a gas is discharged from the inflator 61 to expand the airbag 63.

Furthermore, in this embodiment, a configuration example of a so-called "caseless airbag module" in which the attachment bracket 62 provided with the inflator 61 and the like is attached to the side frame 10 has been described.

However, the present invention is not limited thereto, and a configuration may be employed in which the entire airbag module is stored in a module case while the fastening bolt of the attachment bracket 62 is exposed to the outside.

In this case, an example of the module case may have a structure in which an openable and closeable lid is connected to a case body through a hinge or a structure in which a housing is formed by a lower plate and a case body having a fragile portion such as a V-groove provided in a front surface thereof. Thus, the module case may be opened by the expansion pressure of the airbag.

The upper frame 21 is provided with a pillar support portion 23, and the pillar support portion 23 is provided with a headrest frame (not illustrated). The headrest S3 is formed by providing a cushion member at the outside of the headrest frame.

Figure 4:
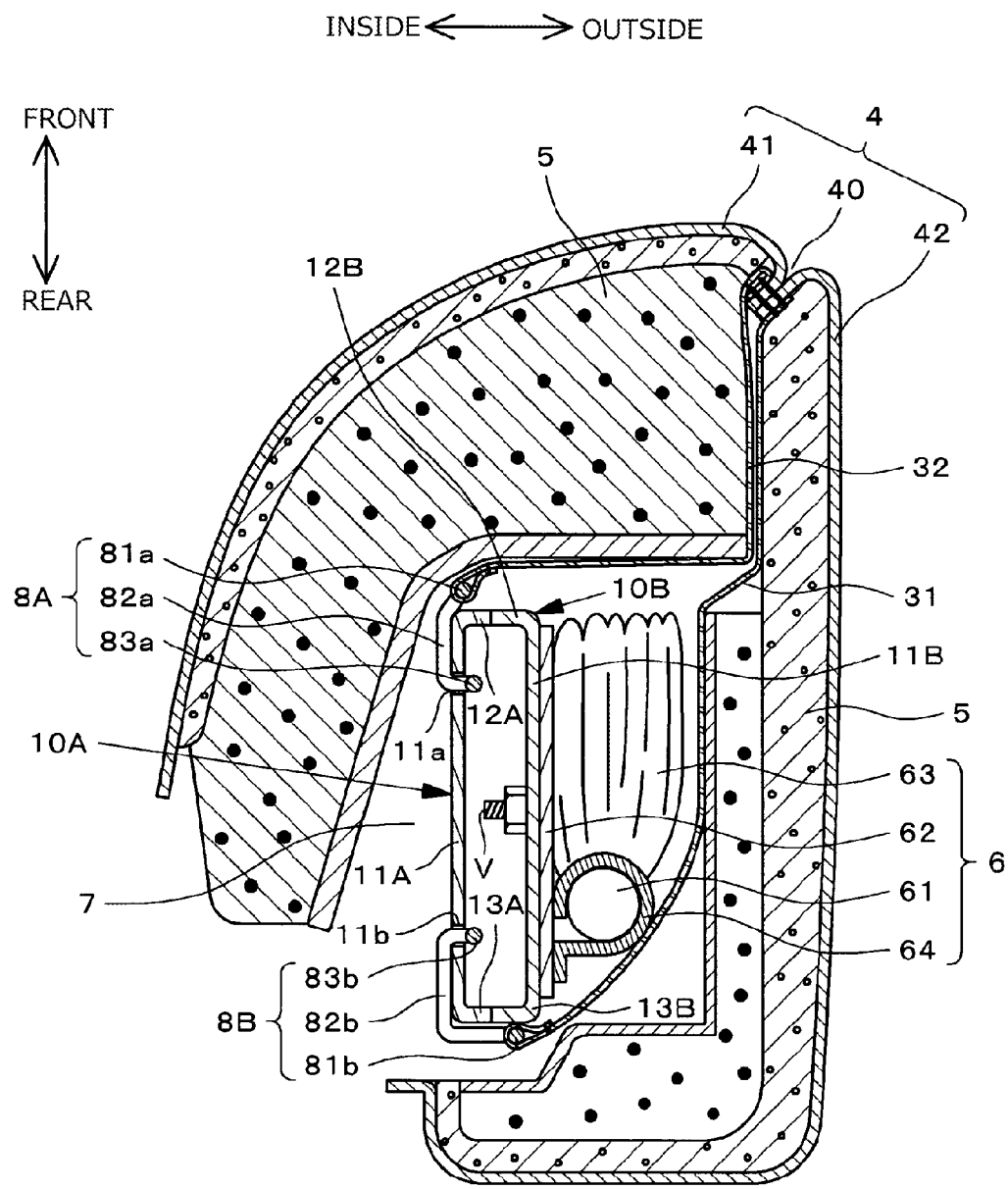
FIG. 4 is a cross-sectional view taken along the line A-A of FIG. 1 according to the embodiment.

As illustrated in FIG. 4, the cushion pad 5 is provided with a space 7 which is used to store the airbag module 6.

The trim cover 4 is formed of an existing material, and is sewn in a bag shape by sewing a front surface gusset portion 41 enclosing right and left bank surfaces from the center of the seat surface and a side surface gusset portion 42 reaching a back surface from a peripheral surface and further connecting a back surface gusset portion (not illustrated) to the side surface gusset portion 42 to be openable and closeable by a slider fastener (not illustrated) as illustrated in FIG. 4.

The trim cover 4 is provided with the fracture portion 40 which is formed at the expansion peak points of the bank portions of the front surface gusset portion 41 and the side surface gusset portion 42. The fracture portion 40 sews the ends of the front surface gusset portion 41 and the side surface gusset portion 42 to each other so that the fracture portion may be broken by a tensile force generated by the expansion of the airbag 63 while the strength endurable for the normal use is maintained.

The first stay cloth 31 and the second stay cloth 32 are formed of a less stretchable cloth material, and are used to transmit a stress generated by the expansion of the airbag 63 to the fracture portion 40.

In more detail, the first stay cloth 31 and the second stay cloth 32 are formed as sheet-shaped members having a stretchable property smaller than the trim cover 4, and one-side ends thereof are sewn to the fracture portion 40 formed in the vicinity of the storage place for the airbag module 6 so that a force generated when the airbag 63 is deployed and expanded is transmitted to the fracture portion 40.

Then, the stay cloths are disposed between the airbag module 6 and the other component so that the other component such as the cushion pad 5 is not broken by a force that promotes the deployment of the airbag 63 and a force that is generated by the expansion force during the deployment of the airbag 63.

The first stay cloth 31 and the second stay cloth 32 correspond to the "guide member". Specifically, the first and second stay cloths serve as the deployment promotion guide member for the airbag 63.

Furthermore, the "guide member" is not limited to the cloth material exemplified as the first stay cloth 31 and the second stay cloth 32 as long as the above-described function is accomplished, and may be arbitrarily selected within the scope without departing from the spirit of the present invention.

Moreover, the shape and the configuration of the "guide member" are not limited to those exemplified in the first stay cloth 31 and the second stay cloth 32, and may be arbitrarily designed within the scope without departing from the spirit of the present invention as long as the above-described function is accomplished.

Then, the first and second stay cloths are disposed between the airbag module 6 and the other component so that the other component such as the cushion pad 5 is not broken by a force that promotes the deployment of the airbag 63 and a force that is generated by the expansion force during the deployment of the airbag 63.

Figure 6:
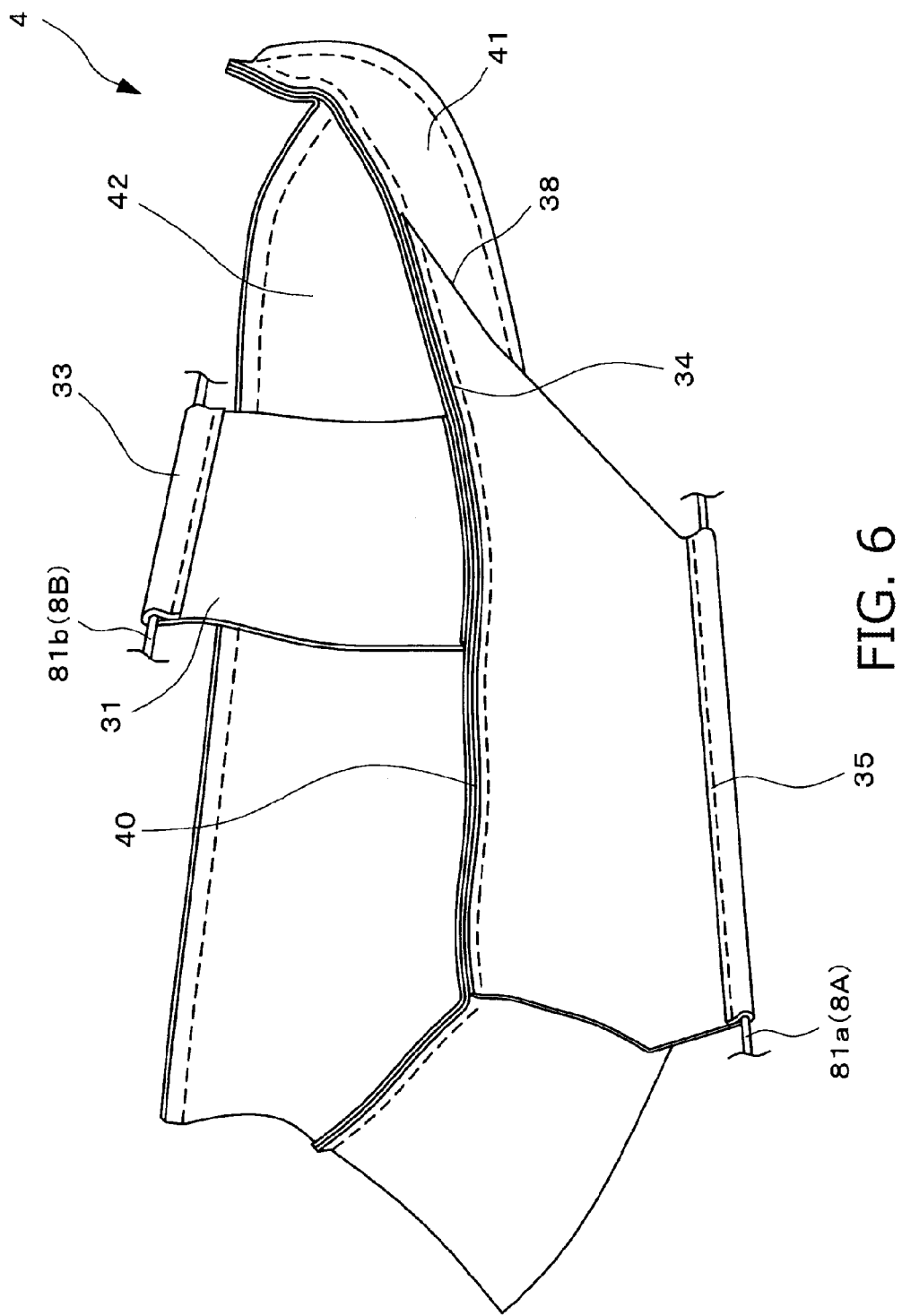
FIG. 6 is a perspective pictorial view illustrating an appearance of a stay cloth according to the embodiment.

As illustrated in FIGS. 4 and 6, the first stay cloth 31 is formed by a substantially rectangular cloth which is elongated in the tensile force application direction, and one-side end thereof is sewn to all of the ends of the front surface gusset portion 41 and the side surface gusset portion 42 of the trim cover 4 and one-side end of the second stay cloth 32 by the fracture portion 40.

At the other-side end of the first stay cloth 31, the end thereof is folded and sewn together in a loop shape in the length direction, and the listing wire 8 (the rear listing wire 8B) is inserted through the sewn loop.

As illustrated in FIG. 6, the second stay cloth 32 is formed by a substantially trapezoid cloth in which an edge 34 near the fracture portion 40 is elongated while the edge 34 near the fracture portion 40 and an edge 35 opposite to the fracture portion 40 are substantially parallel to each other.

One edge 38 of two edges connecting the edge 34 near the fracture portion 40 and the edge 35 opposite to the fracture portion 40 is formed as an edge which is inclined with respect to the edge 34 near the fracture portion 40 and the edge 35 opposite to the fracture portion 40 so that the upper half portion of the front edge 12 of the side frame 10 follows the shape of the inclined portion which protrudes to be inclined forward in a direction from the upside toward the downside.

The end of the edge 35 is folded and sewn together in a loop shape in the length direction, and the listing wire 8 (the front listing wire 8A) is inserted through the sewn loop.

Figure 5:
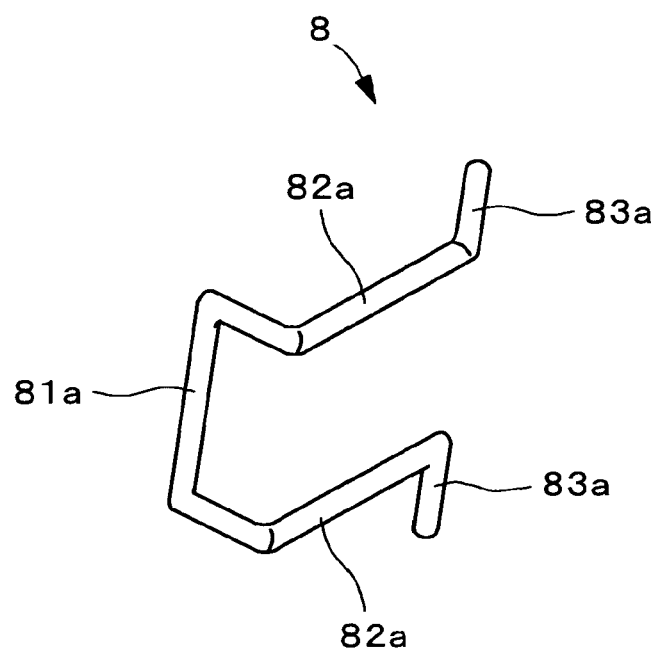
FIG. 5 is a perspective view illustrating the listing wire according to the embodiment.

As illustrated in FIG. 5, the listing wire 8 according to this embodiment is a member that is formed by bending a hard wire such as a hard steel wire and a piano wire.

Hereinafter, the listing wire 8 which is disposed at the front side of the seat and locks the second stay cloth 32 is referred to as the "front listing wire 8A", and the listing wire 8 which is disposed at the rear side of the seat and locks the first stay cloth 31 is referred to as the "rear listing wire 8B".

The front listing wire 8A includes a front stay cloth engagement portion 81a as a guide member engagement portion, two front leg portions 82a and 82a, and two front locking portions 83a and 83a.

The front leg portions 82a and 82a extend from both ends of the front stay cloth engagement portion 81a having a substantially linear shape while forming an obtuse angle.

The front leg portion 82a is formed to follow the front corner of the inner side frame constituting body 10A.

Further, the front locking portions 83a and 83a extend outward (in a direction opposite to the extension direction of the front stay cloth engagement portion 81a) from one-side ends of the front leg portions 82a and 82a (the ends opposite to the continuous side with respect to the front stay cloth engagement portion 81a) to be substantially parallel to the front stay cloth engagement portion 81a.

The rear listing wire 8B includes a rear stay cloth engagement portion 81b as a guide member engagement portion, two rear leg portions 82b and 82b, and two rear locking portions 83b and 83b.

The shape of the rear listing wire 8B is the same as the front listing wire 8A except that the rear leg portions 82b and 82b extend in a substantially perpendicular direction from both ends of the rear stay cloth engagement portion 81b having a substantially linear shape.

That is, the same configuration is employed except that the angle formed between the rear stay cloth engagement portion 81b and the rear leg portion 82b is smaller than the angle formed between the front stay cloth engagement portion 81*a* and the front leg portion 82*a*.

The mechanism of the listing wire 8 will be described.

Since the front listing wire 8A and the rear listing wire 8B are formed in the same way, the front listing wire 8A will be representatively described.

Figure 7:
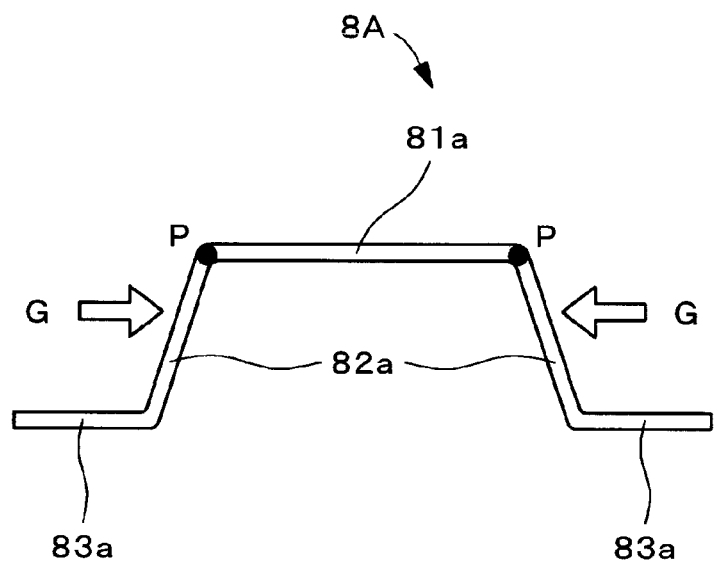
FIG. 7 is a schematic view illustrating a function of the listing wire according to the embodiment.
Figure 7:
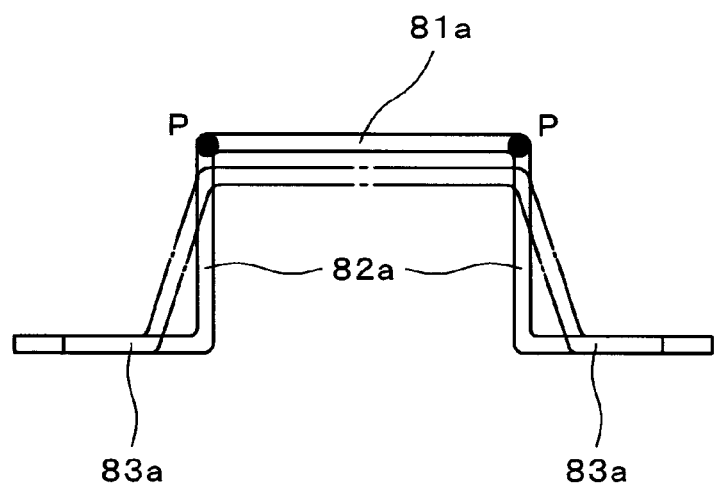

As illustrated in FIG. 7, the front listing wire 8A is formed so that an obtuse angle α° is formed between the front stay cloth engagement portion 81*a* and each of the front leg portions 82*a* and 82*a* as indicated by the solid line in a state where no force is generated (hereinafter, this state will be referred to as the "free state").

Then, the front listing wire 8A is formed so that the continuous portion (the boundary portion) between the front stay cloth engagement portion 81*a* and each of the front leg portions 82*a* and 82*a* is deflected about each of the pivot points P and P (hereinafter, this state will be referred to as the "set state").

The front listing wire may be formed to obtain flexibility by adjusting the hardness of the material and the diameter.

That is, when an action force F is applied in a direction in which the front leg portions 82*a* and 82*a* approach each other, the front leg portions 82*a* and 82*a* are deflected about the pivot points P and P by the flexibility in a direction in which the front leg portions 82*a* and 82*a* approach each other.

For example, when the front locking portions 83*a* and 83*a* are inserted into two locking portions formed in an elongated hole shape while this state is maintained and the front listing wire is returned to the free state, the front listing wire is locked due to the existence of the front locking portions 83*a* and 83*a* at the two locking portions. Accordingly, it is possible to effectively prevent the unintentional release of the locking state of the front listing wire 8A.

In this way, the inner corner portions which are formed by the front leg portions 82*a* and 82*a* and the front locking portions 83*a* and 83*a* are reliably locked to two locking portions.

Further, the set state may be automatically returned to the free state by adjusting the material and the diameter of the front listing wire 8A.

For example, if the hardness of the front listing wire 8A is high to a certain degree, the front leg portions 82*a* and 82*a* which are displaced from the free state to the set state are automatically returned to the free state when the action force G is released by the restoration force.

Accordingly, for example, when the front locking portions 83*a* and 83*a* are inserted into two locking portions formed in an elongated hole shape while the set state is maintained and the action force G is released, the shape is biased to return to the original shape by a restoration force G'. For this reason, the inner corner portions which are formed by the front leg portions 82*a* and 82*a* and the front locking portions 83*a* and 83*a* are reliably locked to the ends of the locking portions.

Further, when the inner corner portions are locked to two locking portions by setting the distance between two locking portions to be slightly shorter than the distance between both inner corner portions formed by the front leg portions 82*a* and 82*a* and the front locking portions 83*a* and 83*a*, the restoration force G' acts on the locking portions in a direction in which the front leg portions 82*a* and 82*a* are separated from each other. For this reason, the front leg portions 82*a* and 82*a* are reliably locked to the locking portions by the restoration force G'.

Since the front locking portions 83*a* and 83*a* exist in this state, it is possible to effectively prevent the unintentional release of the locking state of the front listing wire 8A due to the locking operation.

Configuration and Mechanism of Listing Wire

Next, the relation among the listing wire 8, the side frame 10, the first stay cloth 31, and the second stay cloth 32 will be described with reference to FIGS. 4 to 7.

First, the edge 35 constituting the second stay cloth 32 is formed so that the end thereof is folded and sewn together in a loop shape in the length direction as described above, and the front stay cloth engagement portion 81*a* of the front listing wire 8A is inserted through the sewn loop.

Similarly, the free end of the first stay cloth 31 is formed so that the end thereof is folded and sewn together in a loop shape in the length direction as described above, and the rear stay cloth engagement portion 81*b* of the rear listing wire 8B is inserted through the sewn loop.

In this state, the action force G is applied to the front listing wire 8A and the rear listing wire 8B to change the current state from the free state to the set state.

Next, the front locking portions 83*a* and 83*a* constituting the front listing wire 8A are inserted into the front listing wire locking holes 11*a* and 11*a* to return the current state to the free state.

In this way, the front listing wire 8A is attached to the front listing wire locking holes 11*a* and 11*a* by locking the inner corner portions which are formed by the front leg portions 82*a* and 82*a* and the front locking portions 83*a* and 83*a* to the front listing wire locking holes 11*a* and 11*a*.

The front listing wire 8A is disposed so that the front stay cloth engagement portion 81*a* protrudes toward the front side in relation to the inner side frame constituting body 10A and the front leg portion 82*a* follows the front corner of the inner side frame constituting body 10A by the bent shape thereof.

Accordingly, the second stay cloth 32 is attached to the side frame 10 through the front listing wire 8A while the end attached to the front stay cloth engagement portion 81*a* is located at the front side of the side frame 10.

Similarly, the rear locking portions 83*b* and 83*b* constituting the rear listing wire 8B are inserted into the rear listing wire locking holes 11*b* and 11*b* to return the current state to the free state.

In this way, the rear listing wire 8B is attached to the rear listing wire locking holes 11*b* and 11*b* by locking the inner corner portions formed by the rear leg portions 82*b* and 82*b* and the rear locking portions 83*b* and 83*b* to the rear listing wire locking holes 11*b* and 11*b*.

The rear listing wire 8B is disposed so that the rear stay cloth engagement portion 81*b* protrudes toward the rear side in relation to the inner side frame constituting body 10A and the rear leg portion 82*b* follows the rear corner of the inner side frame constituting body 10A by the bent shape thereof.

Accordingly, the first stay cloth 31 is attached to the side frame 10 through the rear listing wire 8B while the end attached to the rear stay cloth engagement portion 81*b* is located at the rear side of the side frame 10.

The positional relation among the front listing wire 8A, the rear listing wire 8B, the first stay cloth 31, the second stay cloth 32, and the airbag module 6 attached in this way will be described with reference to FIG. 4.

One-side end of the first stay cloth 31 is sutured and fixed to the fracture portion 40 while passing through the outside of the airbag module 6, and the other-side end thereof is attached to the rear side of the side frame 10 through the rear listing wire 8B.

Further, one-side end of the second stay cloth 32 is sutured and fixed to the fracture portion 40 while passing through the front side of the airbag module 6, and the other-side end thereof is attached to the front side of the side frame 10 through the front listing wire 8A.

As described above, according to this embodiment, it is possible to simply and reliably attach the end of the first stay cloth 31 and the end of the second stay cloth 32 to the side frame 10 by using the listing wire 8 having a simple structure.

Accordingly, the configuration may be simplified, and the components may be disposed without disturbing the function of the airbag module 6.

Further, according to this embodiment, the listing wire 8 has a structure shorter and simpler than the existing listing wire.

For this reason, an attachment may be easily performed, and an advantage in cost may be obtained.

Further, in this embodiment, the side frame 10 is formed in a shape in which two bodies are combined with each other. In such a structure, the bonding surface may be increased in area, and hence the rigidity thereof is improved.

Furthermore, the first modified example below shows an available application example of the present invention when the side frame 10 is formed as a single body.

First Modified Example

Figure 8:
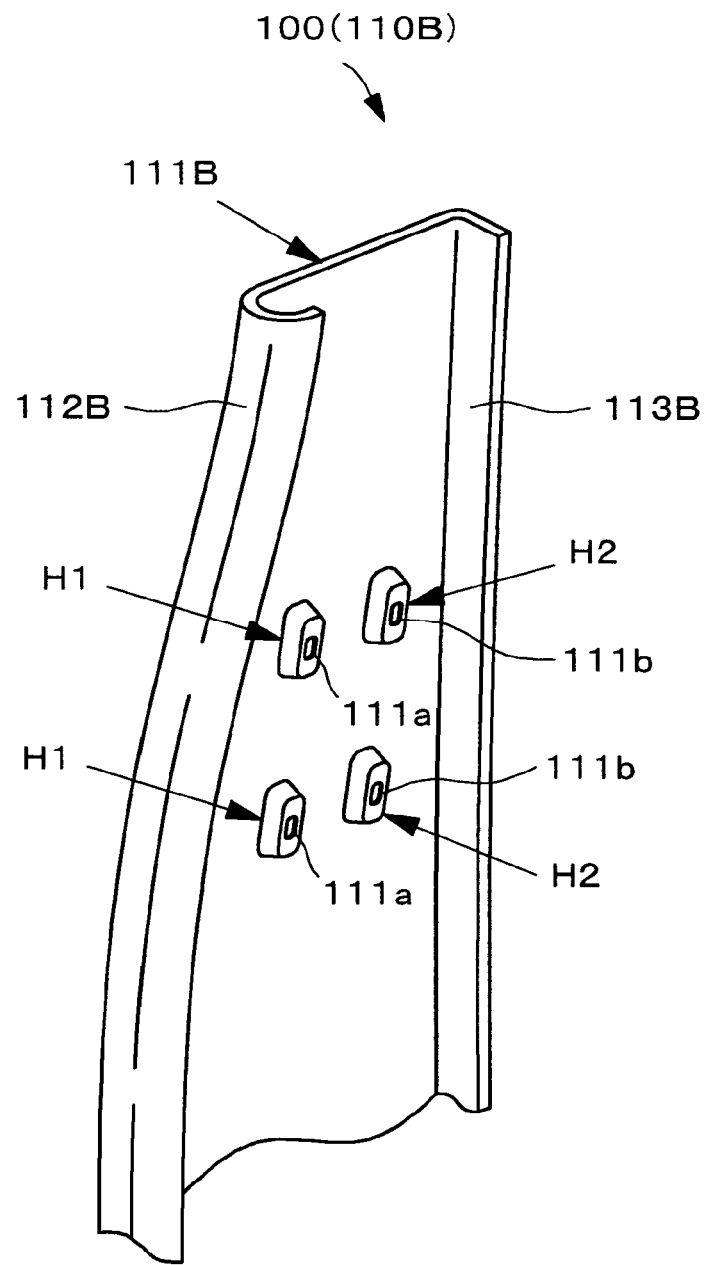
FIG. 8 is a perspective view illustrating a side frame according to a first modified example.
Figure 9:
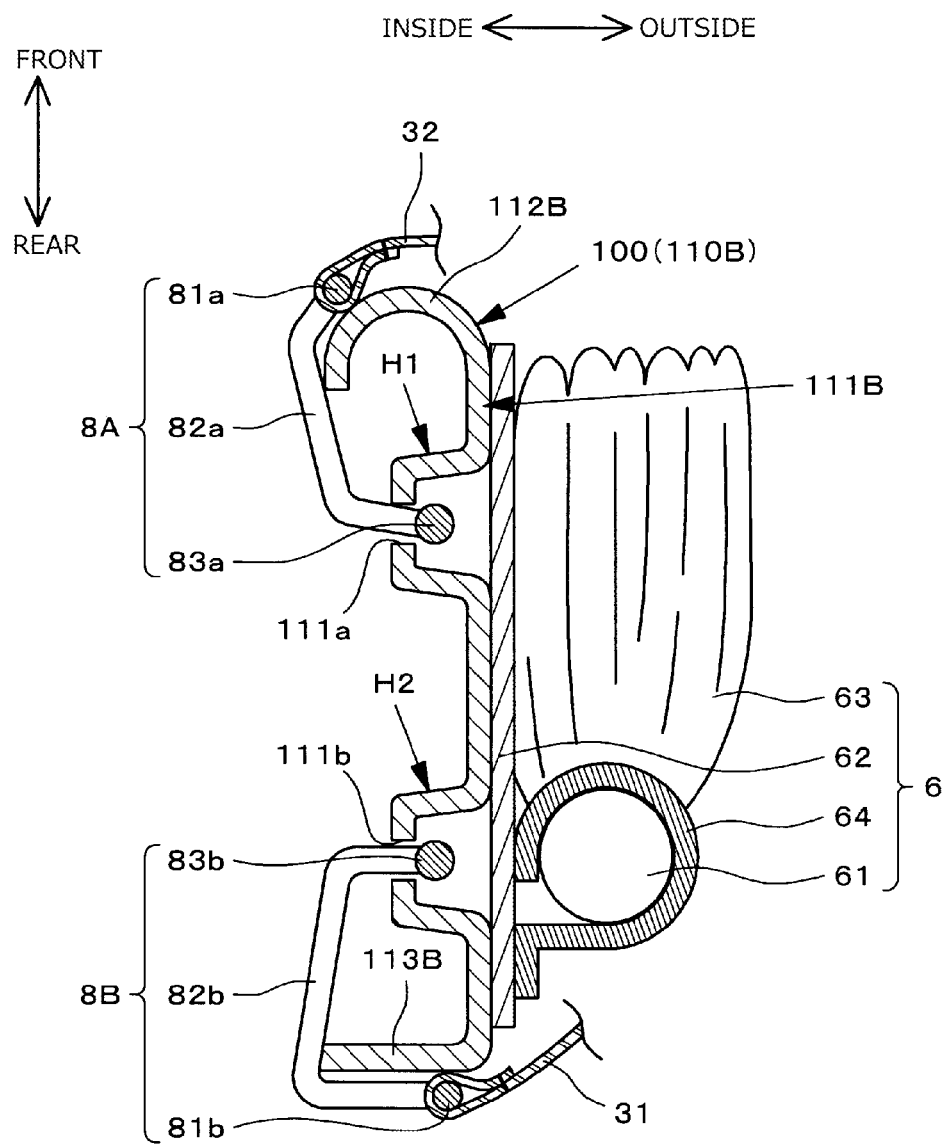
FIG. 9 is a cross-sectional view illustrating a portion corresponding to the line A-A of FIG. 1 in the first modified example.

Next, a modified example of the side frame 10 will be described with reference to FIGS. 8 and 9.

In this example, a second side frame 100 is used, and the other configurations will not be described in that the configurations are the same as those of the above-described embodiment.

The side frame 10 of the above-described embodiment is formed by the combination of the inner side frame constituting body 10A and the outer side frame constituting body 10B, but the second side frame 100 of this example is a single body including only a second outer side frame constituting body 110B.

Furthermore, in this example, the second side frame 100 is the same as the second outer side frame constituting body 110B. In order to easily and clearly compare the above-described embodiment and the modified examples to be described below (including the consistency of reference numerals), the second side frame will be described as the "second outer side frame constituting body 110B" in the description below.

In brief, the second outer side frame constituting body 110B includes a second outer plate 111B which has a substantial plate shape, a second outer front edge 112B which is formed by folding the front end of the second outer plate 111B inward in a U-shape, and a second outer rear edge 113B which is formed by bending the rear end thereof inward in an L-shape.

Then, the second outer front edge 112B has a structure in which the upper half portion thereof becomes an inclined portion inclined with respect to the up and down direction of the vehicle seat S so that the lower side thereof protrudes forward.

Further, the second outer plate 111B is provided with two second front concave portions H1 and H1 which are formed at the front side of the seat in parallel to each other in the up and down direction.

The second front concave portion H1 corresponds to the "interference suppressing portion".

The second front concave portion H1 is formed to protrude toward the inside of the second outer side frame constituting body 110B (that is, the seat inner direction: the bending side of the second outer front edge 112B and the second outer rear edge 113B), and a convex portion and a convex edge are not formed at the outside of the second outer side frame constituting body 110B.

Then, the bottom portions of the two second front concave portions H1 and H1 are respectively provided with second front listing wire locking holes 111a and 111a as locking holes.

Similarly, the second outer plate 111B is provided with two second rear concave portions H2 and H2 which are formed as the interference suppressing portions at the rear side of the seat in parallel to each other in the up and down direction.

The second rear concave portion H2 is formed to protrude toward the inside of the second outer side frame constituting body 110B (that is, the bending side of the seat inner direction: the second outer front edge 112B and the second outer rear edge 113B), and the outside of the second outer side frame constituting body 110B is not provided with a convex portion and a convex edge.

Then, the bottom portions of the two second rear concave portions H2 and H2 are respectively provided with second rear listing wire locking holes 111b and 111b as the locking holes.

Further, in this embodiment, the second front listing wire locking holes 111a and 111a (the second front concave portions H1 and H1) and the second rear listing wire locking holes 111b and 111b (the second rear concave portions H2 and H2) are disposed at substantially the same height position.

The attachment structure of the second outer side frame constituting body 110B, the airbag module 6, and the listing wire 8 with such a configuration will be described with reference to FIG. 9.

As described above, the second front concave portion H1 and the second rear concave portion H2 are formed in a shape in which a convex portion and a convex edge are not formed at the outside of the second outer side frame constituting body 110B.

That is, the outer surface (i.e., the seat outer direction: the opposite side to the bending side of the second outer front edge 112B and the second outer rear edge 113B) of the second outer side frame constituting body 110B is not provided with a portion protruding in the seat outer direction, and hence the attachment bracket 62 may be provided in a flat state.

Then, the front listing wire 8A and the rear listing wire 8B are attached to the second outer side frame constituting body 110B.

That is, the front listing wire 8A is attached to the second front listing wire locking holes 111a and 111a by locking the inner corner portions formed by the front leg portions 82a and 82a and the front locking portions 83a and 83a to the second front listing wire locking holes 111a and 111a.

The front listing wire 8A is disposed so that the front stay cloth engagement portion 81a protrudes toward the front side in relation to the second outer side frame constituting body 110B and the front leg portion 82a follows the front shape of the second outer side frame constituting body 110B by the bent shape thereof.

Accordingly, the second stay cloth 32 is attached to the second outer side frame constituting body 110B through the front listing wire 8A while the end attached to the front stay cloth engagement portion 81a is located at the front side of the second outer side frame constituting body 110B.

Similarly, the rear listing wire 8B is attached to the second rear listing wire locking holes 111b and 111b by locking the inner corner portions formed by the rear leg portions 82b and 82b and the rear locking portions 83b and 83b to the second rear listing wire locking holes 111b and 111b.

The rear listing wire 8B is disposed so that the rear stay cloth engagement portion 81b protrudes toward the rear side in relation to the second outer side frame constituting body 110B and the rear leg portion 82b follows the rear shape of the second outer side frame constituting body 110B by the bent shape thereof.

Accordingly, the first stay cloth 31 is attached to the second outer side frame constituting body 110B through the rear listing wire 8B while the end attached to the rear stay cloth engagement portion 81b is located at the rear side of the second outer side frame constituting body 110B.

Further, in this example, since the front locking portions 83a and 83a are stored in the second front concave portions H1 and H1 and the rear locking portions 83b and 83b are stored in the second rear concave portions H2 and H2, the front locking portions 83a and 83a and the rear locking portions 83b and 83b do not protrude toward the outer surface of the second outer side frame constituting body 110B.

For this reason, it is possible to place and fix the attachment bracket 62 to the outer surface of the second outer side frame constituting body 110B in a flat state.

Accordingly, even when the second side frame 100 is formed as the single second outer side frame constituting body 110B, it is possible to effectively prevent the interference between the listing wire 8 and the airbag module 6 (the attachment bracket 62).

Second Modified Example

Figure 10:
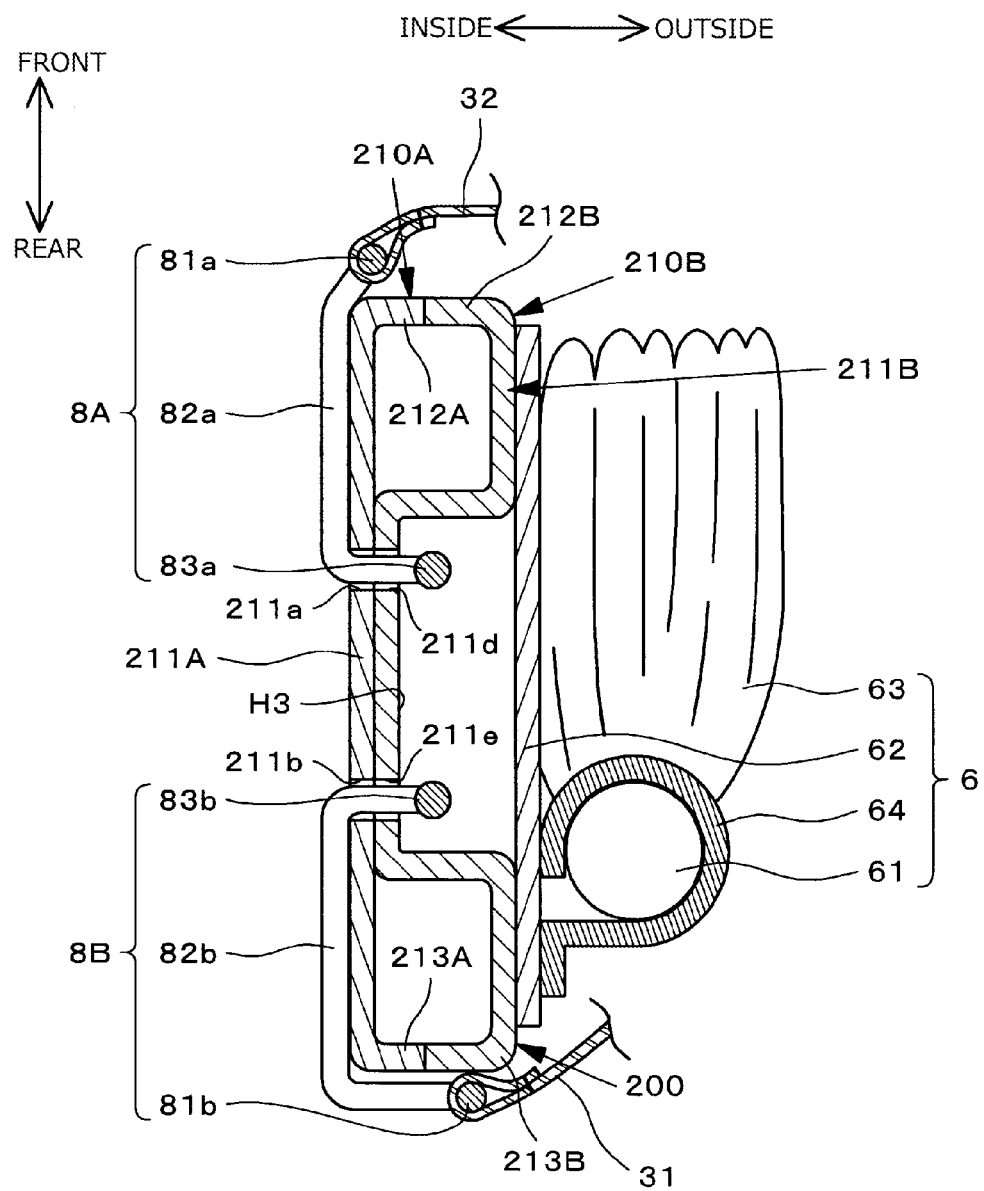
FIG. 10 is a cross-sectional view illustrating a portion corresponding to the line A-A of FIG. 1 in a second modified example.

Next, a modified example of the side frame 10 will be described with reference to FIG. 10.

In this example, a third side frame 200 is used, and the other configurations will not be described in that the configurations are the same as those of the above-described embodiment.

The third side frame 200 of this example is formed by the combination of a third inner side frame constituting body 210A and a third outer side frame constituting body 210B.

The third inner side frame constituting body 210A includes a third inner plate 211A which has a substantial plate shape, a third inner front edge 212A which is formed by folding the front end of the third inner plate 211A inward in a U-shape, and a third inner rear edge 213A which is formed by bending the rear end thereof inward in an L-shape.

Then, the third inner front edge 212A has a structure in which the upper half portion thereof becomes an inclined portion inclined with respect to the up and down direction of the vehicle seat S so that the lower side thereof protrudes forward.

Similarly, the third outer side frame constituting body 210B includes a third outer plate 211B which has a substantial plate shape, a third outer front edge 212B which is formed by folding the front end of the third outer plate 211B inward in a U-shape, and a third outer rear edge 213B which is formed by bending the rear end thereof inward in an L-shape.

Then, the third outer front edge 212B has a structure in which the upper half portion thereof becomes an inclined portion inclined with respect to the up and down direction of the vehicle seat S so that the lower side thereof protrudes forward.

Then, the third side frame 200 is formed by the combination of the third inner side frame constituting body 210A and the third outer side frame constituting body 210B when the end edge of the third inner front edge 212A is bonded to the end edge of the third outer front edge 212B and the end edge of the third inner rear edge 213A is bonded to the end edge of the third outer rear edge 213B while the inner wall of the third inner plate 211A faces the inner wall of the third outer plate 211B.

Further, in this example, two third inner front listing wire locking holes 211a and 211a are formed as the locking holes at the front side of the seat in parallel to each other in the up and down direction in the third inner plate 211A constituting the third inner side frame constituting body 210A.

Similarly, two third inner rear listing wire locking holes 211b and 211b are formed as the locking holes at the rear side of the seat in parallel to each other in the up and down direction.

Moreover, in this example, the third outer plate 211B constituting the third outer side frame constituting body 210B is provided with a third concave portion H3 which is formed as the interference suppressing portion.

The third concave portion is formed in the vicinity of the substantial center of the third concave portion H3 in the width direction of the seat to protrude toward the inside of the third outer side frame constituting body 210B (that is, the bending side of the seat inner direction: the third outer front edge 212B and the third outer rear edge 213B), and the outside of the third outer side frame constituting body 210B is not provided with a convex portion and a convex edge.

Then, the bottom portion of the third concave portion H3 is provided with third outer front listing wire locking holes 211d and 211d as the locking holes and third outer rear listing wire locking holes 211e and 211e as the locking holes.

Furthermore, the third concave portion H3 may be divided into a third upper concave portion H31 and a third lower concave portion H32, the third outer front listing wire locking hole 211d located at the upside and the third outer rear listing wire locking hole 211e located at the upside may be formed at the bottom portion of the third upper concave portion H31, and the third outer front listing wire locking hole 211d located at the downside and the third outer rear listing wire locking hole 211e located at the downside may be formed at the bottom portion of the third lower concave portion H32.

Furthermore, when the third inner side frame constituting body 210A and the third outer side frame constituting body 210B are combined with each other, the outer surface of the bottom surface of the third concave portion H3 formed in the third outer side frame constituting body 210B and the inner wall surface of the third inner side frame constituting body 210A matching the position are close to each other or contact each other. In this state, the third inner front listing wire locking holes 211a and 211a and the third inner rear listing wire locking holes 211b and 211b respectively communicate with the third outer front listing wire locking holes 211d and 211d and the third outer rear listing wire locking holes 211e and 211e, and the listing wire 8 is inserted through the communication holes.

That is, the listing wire 8 is formed to penetrate a position where the third inner side frame constituting body 210A and the third outer side frame constituting body 210B are closest to each other.

Hereinafter, the communication holes (two communication holes) of the third inner front listing wire locking holes 211a and 211a with respect to the third outer front listing wire locking holes 211d and 211d are referred to as the "front communication holes R1", and the communication holes (two communication holes) of the third inner rear listing wire locking holes 211b and 211b with respect to the third outer rear listing wire locking holes 211e and 211e are referred to as the "rear communication holes R2".

The attachment structure of the third outer side frame constituting body 210B, the airbag module 6, and the listing wire 8 with such a configuration will be described.

As described above, the third concave portion H3 is formed in a shape in which a convex portion and a convex edge are not formed at the outside of the third outer side frame constituting body 210B.

That is, the outer surface (i.e., the opposite side to the bending side of the seat outer direction: the third outer front edge 212B and the third outer rear edge 213B) of the third outer side frame constituting body 210B is not provided with a protruding portion in the seat outer direction, and hence the attachment bracket 62 may be provided in a flat state.

Then, the front listing wire 8A and the rear listing wire 8B are attached to the third outer side frame constituting body 210B.

That is, the front listing wire 8A is attached to the front communication holes R1 and R1 by locking the inner corner portions formed by the front leg portions 82a and 82a and the front locking portions 83a and 83a to the front communication holes R1 and R1.

The front listing wire 8A is disposed so that the front stay cloth engagement portion 81a protrudes toward the front side in relation to the third side frame 200 and the front leg portion 82a follows the front shape of the third side frame 200 by the bent shape thereof.

Accordingly, the second stay cloth 32 is attached to the third side frame 200 through the front listing wire 8A while the end attached to the front stay cloth engagement portion 81a is located at the front side of the third side frame 200.

Similarly, the rear listing wire 8B is attached to the rear communication holes R2 and R2 by locking the inner corner portions formed by the rear leg portions 82b and 82b and the rear locking portions 83b and 83b to the rear communication holes R2 and R2.

The rear listing wire 8B is disposed so that the rear stay cloth engagement portion 81b protrudes toward the rear side in relation to the third side frame 200 and the rear leg portion 82b follows the rear shape of the third side frame 200 by the bent shape thereof.

Accordingly, the first stay cloth 31 is attached to the third side frame 200 through the rear listing wire 8B while the end attached to the rear stay cloth engagement portion 81b is located at the rear side of the third side frame 200.

Further, in this example, since the front locking portions 83a and 83a and the rear locking portions 83b and 83b are stored in the third concave portion H3, the front locking portions 83a and 83a and the rear locking portions 83b and 83b do not protrude toward the outer surface of the third outer side frame constituting body 210B.

For this reason, it is possible to place and fix the attachment bracket 62 to the outer surface of the third outer side frame constituting body 210B in a flat state.

Accordingly, it is possible to effectively prevent the interference between the listing wire 8 and the airbag module 6 (the attachment bracket 62).

Third Modified Example

Figure 11:
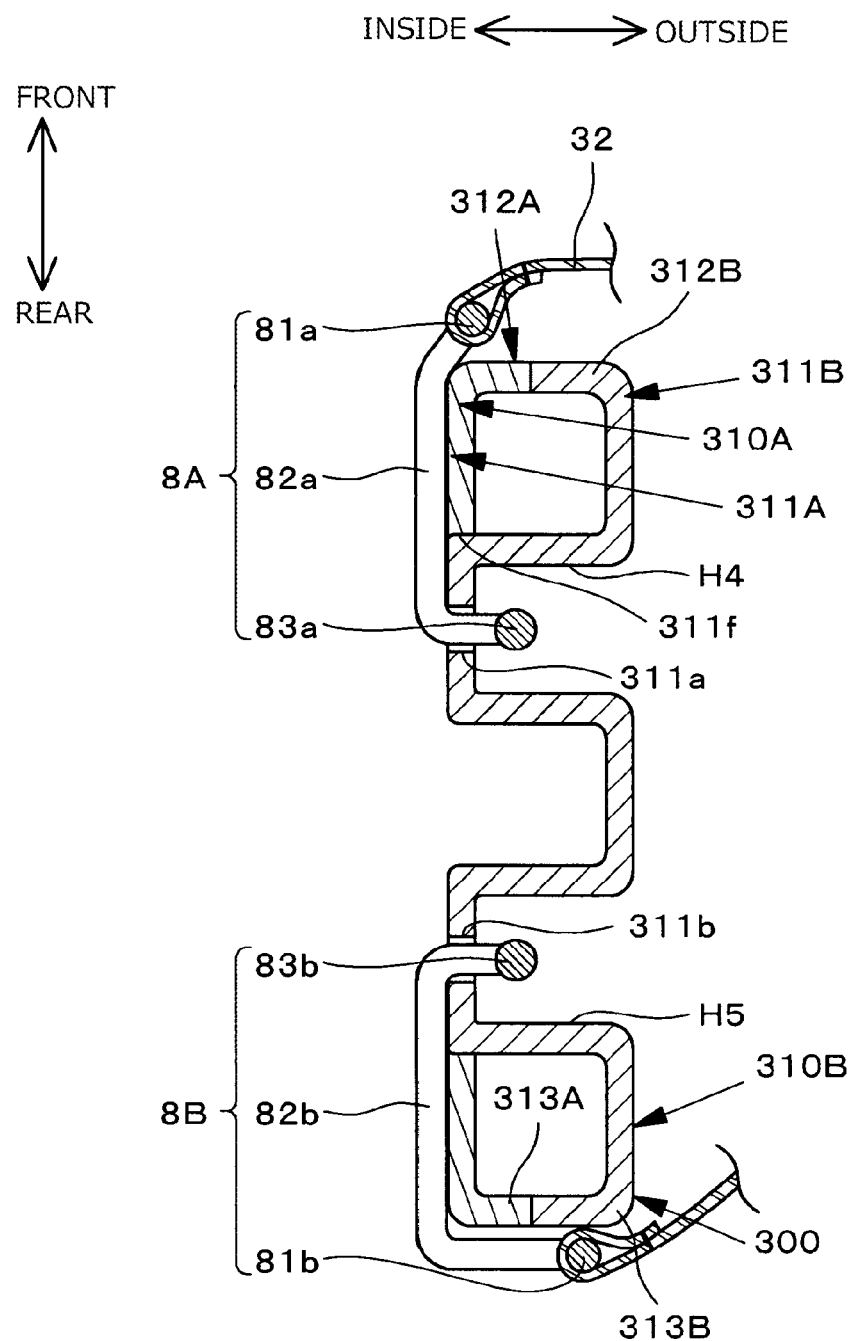
FIG. 11 is a cross-sectional view illustrating a portion corresponding to the line A-A of FIG. 1 in a third modified example.

Next, a modified example of the side frame 10 will be described with reference to FIG. 11.

In this example, a fourth side frame 300 is used, and the other configurations will not be described in that the configurations are the same as those of the above-described embodiment.

The fourth side frame 300 of this example is formed by the combination of a fourth inner side frame constituting body 310A and a fourth outer side frame constituting body 310B.

The fourth inner side frame constituting body 310A includes a fourth inner plate 311A which has a substantial plate shape, a fourth inner front edge 312A which is formed by folding the front end of the fourth inner plate 311A inward in a U-shape, and a fourth inner rear edge 313A which is formed by bending the rear end thereof inward in an L-shape.

Further, the fourth inner front edge 312A has a structure in which the upper half portion thereof becomes an inclined portion inclined with respect to the up and down direction of the vehicle seat S so that the lower side thereof protrudes forward.

Similarly, the fourth outer side frame constituting body 310B includes a fourth outer plate 311B which has a substantial plate shape, a fourth outer front edge 312B which is formed by folding the front end of the fourth outer plate 311B inward in a U-shape, and a fourth outer rear edge 313B which is formed by bending the rear end thereof inward in an L-shape.

Further, the fourth outer front edge 312B has a structure in which the upper half portion thereof becomes an inclined portion inclined with respect to the up and down direction of the vehicle seat S so that the lower side thereof protrudes forward.

Then, the fourth side frame 300 is formed by the combination of the fourth inner side frame constituting body 310A and the fourth outer side frame constituting body 310B when the end edge of the fourth inner front edge 312A is bonded to the end edge of the fourth outer front edge 312B and the end edge of the fourth inner rear edge 313A is bonded to the end edge of the fourth outer rear edge 313B while the inner wall of the fourth inner plate 311A and the inner wall of the fourth outer plate 311B face each other.

Further, in this example, an engagement hole 311f is formed at the arrangement position of the listing wire 8 of the fourth inner plate 311A constituting the fourth inner side frame constituting body 310A.

Furthermore, in this example, the fourth outer plate 311B constituting the fourth outer side frame constituting body 310B is provided with two fourth front concave portions H4 and H4 which are formed as the interference suppressing portions at the front side of the seat in parallel to each other in the up and down direction.

The fourth front concave portion H4 is formed to protrude toward the inside of the fourth outer side frame constituting body 310B (that is, the seat inner direction: the bending side of the fourth outer front edge 312B and the fourth outer rear edge 313B), and the outside of the fourth outer side frame constituting body 310B is not provided with a convex portion and a convex edge.

Then, the bottom portions of two fourth front concave portions H4 and H4 are respectively provided with fourth front listing wire locking holes 311a and 311a as the locking holes.

Similarly, the fourth outer plate 311B is provided with two fourth rear concave portions H5 and H5 which are formed as the interference suppressing portions at the rear side of the seat in parallel to each other in the up and down direction.

The fourth rear concave portion H5 is formed to protrude toward the inside of the fourth outer side frame constituting body 310B (that is, the seat inner direction: the bending side of the fourth outer front edge 312B and the fourth outer rear edge 313B), and the outside of the fourth outer side frame constituting body 310B is not provided with a convex portion and a convex edge.

Then, the bottom portions of two fourth rear concave portions H5 and H5 are respectively provided with fourth rear listing wire locking holes 311b and 311b as the locking holes.

Further, the fourth front concave portions H4 and H4 and the fourth rear concave portions H5 and H5 engage with the engagement holes 311f.

That is, the front side wall portions of the fourth front concave portions H4 and H4 and the rear side wall portions of the fourth rear concave portions H5 and H5 are formed to respectively engage with the front inner peripheral edge and the rear inner peripheral edge of the engagement hole 311f.

Then, in this state, the fourth front listing wire locking holes 311a and 311a and the fourth rear listing wire locking holes 311b and 311b are exposed in the seat inner direction.

That is, the fourth front and rear listing wire locking holes are exposed to the seat inner surface of the fourth inner side frame constituting body 310A.

Next, the attachment structure of the fourth outer side frame constituting body 310B, the airbag module 6, and the listing wire 8 with such a configuration will be described.

As described above, the fourth front concave portion H4 and the fourth rear concave portion H5 are formed in a shape in which a convex portion and a convex edge are not formed at the outside of the fourth outer side frame constituting body 310B.

That is, the outer surface (that is, the seat outer direction: the opposite side to the bending side of the fourth outer front edge 312B and the fourth outer rear edge 313B) of the fourth outer side frame constituting body 310B is not provided with a protruding portion in the seat outer direction, and hence the attachment bracket 62 may be provided in a flat state.

Then, the front listing wire 8A and the rear listing wire 8B are attached to the fourth outer side frame constituting body 310B.

That is, the front listing wire 8A is attached to the fourth front listing wire locking holes 311a and 311a by locking the inner corner portions formed by the front leg portions 82a and 82a and the front locking portions 83a and 83a to the fourth front listing wire locking holes 311a and 311a.

The front listing wire 8A is disposed so that the front stay cloth engagement portion 81a protrudes toward the front side in relation to the fourth outer side frame constituting body 310B and the front leg portion 82a follows the front shape of the fourth outer side frame constituting body 310B by the bent shape thereof.

Accordingly, the second stay cloth 32 is attached to the fourth outer side frame constituting body 310B through the front listing wire 8A while the end attached to the front stay cloth engagement portion 81a is located at the front side of the fourth outer side frame constituting body 310B.

Similarly, the rear listing wire 8B is attached to the fourth rear listing wire locking holes 311b and 311b by locking the inner corner portions formed by the rear leg portions 82b and 82b and the rear locking portions 83b and 83b to the fourth rear listing wire locking holes 311b and 311b.

The rear listing wire 8B is disposed so that the rear stay cloth engagement portion 81b protrudes toward the rear side in relation to the fourth outer side frame constituting body 310B and the rear leg portion 82b follows the rear shape of the fourth outer side frame constituting body 310B by the bent shape thereof.

Accordingly, the first stay cloth 31 is attached to the fourth outer side frame constituting body 310B through the rear listing wire 8B while the end attached to the rear stay cloth engagement portion 81b is located at the rear side of the fourth outer side frame constituting body 310B.

Further, in this example, since the front locking portions 83a and 83a are stored in the fourth front concave portions H4 and H4 and the rear locking portions 83b and 83b are stored in the fourth rear concave portions H5 and H5, the front locking portions 83a and 83a and the rear locking portions 83b and 83b do not protrude toward the outer surface of the fourth outer side frame constituting body 310B.

For this reason, it is possible to place and fix the attachment bracket 62 to the outer surface of the fourth outer side frame constituting body 310B in a flat state.

Accordingly, it is possible to effectively prevent the interference between the listing wire 8 and the airbag module 6 (the attachment bracket 62).

REFERENCE SIGNS LIST

S vehicle seat
S1 seat back
S2 seat portion
S3 headrest
F seat frame
V bolt
1 seat back frame
10 side frame
10A inner side frame constituting body
11A inner plate
11a front listing wire locking hole (locking hole)
11b rear listing wire locking hole (locking hole)
12A inner front edge
13A inner rear edge
10B outer side frame constituting body
11B outer plate
11c airbag module attachment hole
12B outer front edge
13B outer rear edge
21 upper frame
22 lower frame
23 pillar support portion
2 seat frame
3 reclining mechanism
4 trim cover
40 fracture portion
41 front surface gusset portion
42 side surface gusset portion
5 cushion pad
6 airbag module
61 inflator
62 attachment bracket (attachment member)
63 airbag
64 inflator bracket
7 space
8 listing wire
8A front listing wire, guide member end attachment member, stay cloth end attachment member 81*a* front stay cloth engagement portion (guide member engagement portion)
82*a* front leg portion
83*a* front locking portion
8B rear listing wire, guide member end attachment member, stay cloth end attachment member
81*b* rear stay cloth engagement portion (guide member engagement portion)
82*b* rear leg portion
83*b* rear locking portion
G action force
P pivot point
31 first stay cloth (guide member)
32 second stay cloth (guide member)
34 edge near fracture portion
35 edge opposite to fracture portion
36 attachment portion
37 trim plate
38 one edge First Modified Example 1 seat back frame
100 second side frame
110B second outer side frame constituting body
111B second outer plate
H1 second front concave portion (interference suppressing portion)
111*a* second front listing wire locking hole (locking hole)
H2 second rear concave portion (interference suppressing portion)
111*b* second rear listing wire locking hole (locking hole)
112B second outer front edge
113B second outer rear edge Second Modified Example 1 seat back frame
200 third side frame
210A third inner side frame constituting body
211A third inner plate
211*a* third inner front listing wire locking hole (locking hole)
211*b* third inner rear listing wire locking hole (locking hole)
212A third inner front edge
213A third inner rear edge
210B third outer side frame constituting body
211B outer plate
H3 third concave portion (interference suppressing portion)
(H31 third upper concave portion)
(H32 third lower concave portion)
211*d* third outer front listing wire locking hole (locking hole)
211*e* third outer rear listing wire locking hole (locking hole)
212B third outer front edge
213B third outer rear edge Third Modified Example 1 seat back frame
300 fourth side frame
310A fourth inner side frame constituting body
311A fourth inner plate
311*f* engagement hole
312A fourth inner front edge
313A fourth inner rear edge
310B fourth outer side frame constituting body
311B fourth outer plate
H4 fourth front concave portion (interference suppressing portion)
H5 fourth rear concave portion (interference suppressing portion)
311*a* fourth front listing wire locking hole (locking hole)
311*b* fourth rear listing wire locking hole (locking hole)
312B fourth outer front edge
313B fourth outer rear edge

The invention claimed is:

1. A seat frame comprising:
a seat back frame in which an airbag module is disposed; wherein:
the seat back frame comprises a guide member end attachment member that locks an end of a guide member for facilitating deployment of an airbag provided in the airbag module;
a guide member attachment position of the guide member end attachment member is disposed at an inside of the seat back frame in relation to an airbag module attachment position; and
the guide member end attachment member comprises:
a guide member engagement portion that locks the guide member;
leg portions that are respectively bent at an obtuse angle from both ends of the guide member engagement portion and extend in a same direction; and
locking portions that respectively extend from front extension portions of the leg portions while being bent in a direction moving away from the guide member engagement portion,
the locking portions are locked to locking holes formed in side frames extending while being separated from each other in a width direction of the seat back frame;
the airbag module is disposed at an outside of the side frame; and
the guide member engagement portion engages with an end of the guide member at an inside of the side frame in relation to the airbag module attachment position.

2. The seat frame according to claim 1, wherein the leg portions are:
disposed to extend from the locking holes toward a front or rear side of the side frame; and
bent to follow a shape of a front or rear corner of the side frame.

3. The seat frame according to claim 1, wherein:
a plurality of the locking portions are locked to a plurality of the locking holes formed in the side frame;
a minimal distance between the plurality of the locking portions is set to be larger than a distance between the plurality of the locking holes;
the guide member end attachment member is formed as a flexible member; and
when the plurality of the locking portions are locked to the plurality of the locking holes while a force is applied to a plurality of the leg portions so that the minimal distance between the plurality of the locking portions decreases, and the force is released, the locking portions are locked by restoration forces of the plurality of the leg portions.

4. The seat frame according to claim 1, wherein the side frame is provided with an interference suppressing portion that stores the locking portion to suppress an interference with an airbag module attachment member.

5. The seat frame according to claim 4, wherein:
the interference suppressing portion is a hole that protrudes toward the inside of the side frame and a bottom surface of the interference suppressing portion is provided with the locking hole; and
a free end of the locking portion is inserted in a direction from the inside of the side frame toward the outside thereof to be located within the interference suppressing portion.

6. A seat frame comprising:
a seat back frame in which an airbag module is disposed; wherein:
the seat back frame comprises a stay cloth end attachment member that locks an end of a stay cloth for facilitating deployment of an airbag provided in the airbag module;
the stay cloth end attachment member comprises:
a stay cloth engagement portion that engages with the stay cloth; and
locking portions that respectively extend while being bent in a direction moving away from the stay cloth engagement portion;
the stay cloth engagement portion is disposed at an inner side of the seat back frame in a seat back frame width direction in relation to an airbag module attachment position at which the airbag module is attached to the seat back frame; and
the locking portions are locked to locking holes formed in side frames extending while being separated from each other in the seat back frame width direction.

7. The seat frame according to claim 6, wherein:
the stay cloth end attachment member further comprises:
leg portions that are respectively bent at an obtuse angle from both ends of the stay cloth engagement portion and extend in a same direction;
the airbag module is disposed at an outside of the side frame; and
the stay cloth engagement portion engages with an end of the stay cloth at an inner side of the side frame in the seat back frame width direction in relation to the airbag module attachment position.

8. The seat frame according to claim 7, wherein the leg portions are:
disposed to extend from the locking holes toward a front or rear side of the side frame; and
bent to follow a shape of a front or rear corner of the side frame.

9. The seat frame according to claim 7, wherein:
a plurality of the locking portions are locked to a plurality of the locking holes formed in the side frame;
a minimal distance between the plurality of the locking portions is set to be larger than a distance between the plurality of the locking holes;
the stay cloth end attachment member is formed as a flexible member; and
when the plurality of the locking portions are locked to the plurality of the locking holes while a force is applied to a plurality of the leg portions so that the minimal distance between the plurality of the locking portions decreases, and the force is released, the locking portions are locked by restoration forces of the plurality of the leg portions.

10. The seat frame according to claim 7, wherein the side frame is provided with an interference suppressing portion that stores the locking portion to suppress an interference with an airbag module attachment member.

11. The seat frame according to claim 10, wherein:
the interference suppressing portion is a hole that protrudes toward the inside of the side frame and a bottom surface of the interference suppressing portion is provided with the locking hole; and
a free end of the locking portion is inserted in a direction from the inside of the side frame toward the outside thereof to be located within the interference suppressing portion.

12. A seat frame comprising:
a seat back frame in which an airbag module is disposed; wherein:
the seat back frame comprises a guide member end attachment member that locks an end of a guide member for facilitating deployment of an airbag provided in the airbag module;
the guide member end attachment member is a wire and comprises:
a guide member engagement portion that engages with the guide member; and
locking portions that respectively extend while being bent in a direction moving away from the guide member engagement portion;
the guide member engagement portion is disposed at an inner side of the seat back frame in a seat back frame width direction in relation to an airbag module attachment position at which the airbag module is attached to the seat back frame; and
the locking portions are locked to locking holes formed in side frames extending while being separated from each other in the seat back frame width direction.

13. The seat frame according to claim 12, wherein:
the guide member end attachment member comprises:
leg portions that are respectively bent at an obtuse angle from both ends of the guide member engagement portion and extend in a same direction;
the airbag module is disposed at an outside of the side frame; and
the guide member engagement portion engages with an end of the guide member at an inner side of the side frame in the seat back frame width direction in relation to the airbag module attachment position.

14. The seat frame according to claim 13, wherein the leg portions are:
disposed to extend from the locking holes toward a front or rear side of the side frame; and
bent to follow a shape of a front or rear corner of the side frame.

15. The seat frame according to claim 13, wherein:
a plurality of the locking portions are locked to a plurality of the locking holes formed in the side frame;
a minimal distance between the plurality of the locking portions is set to be larger than a distance between the plurality of the locking holes;
the stay cloth end attachment member is formed as a flexible member; and
when the plurality of the locking portions are locked to the plurality of the locking holes while a force is applied to a plurality of the leg portions so that the minimal distance between the plurality of the locking portions decreases, and the force is released, the locking portions are locked by restoration forces of the plurality of the leg portions.

16. The seat frame according to claim 13, wherein the side frame is provided with an interference suppressing portion that stores the locking portion to suppress an interference with an airbag module attachment member.

17. The seat frame according to claim 16, wherein:
the interference suppressing portion is a hole that protrudes toward the inside of the side frame and a bottom surface of the interference suppressing portion is provided with the locking hole; and a free end of the locking portion is inserted in a direction from the inside of the side frame toward the outside thereof to be located within the interference suppressing portion.

* * * * *